United States Patent [19]

Chang et al.

[11] Patent Number: 5,600,644
[45] Date of Patent: Feb. 4, 1997

[54] METHOD AND APPARATUS FOR INTERCONNECTING LANS

[75] Inventors: Tian-Pong P. Chang, Holmdel; Seyhan Civanlar, Middletown Township, Monmouth County; Vikram R. Saksena, Freehold, all of N.J.

[73] Assignee: AT&T, Holmdel, N.J.

[21] Appl. No.: 402,235

[22] Filed: Mar. 10, 1995

[51] Int. Cl.$^6$ ................................. H04L 12/46
[52] U.S. Cl. .................... 370/404; 370/396; 370/257; 370/469
[58] Field of Search ................ 370/60, 60.1, 85.13, 370/85.14, 54; 395/200.02

[56] References Cited

U.S. PATENT DOCUMENTS

| | | | |
|---|---|---|---|
| 4,823,338 | 4/1989 | Chan | 370/85 |
| 5,317,568 | 5/1994 | Bixby et al. | 370/85.13 |
| 5,329,527 | 7/1994 | Ujihashi et al. | 370/85.13 |
| 5,345,443 | 9/1994 | D'Ambrogio et al. | 370/60.1 |
| 5,473,679 | 12/1995 | La Porta et al. | 370/60.1 |
| 5,490,140 | 2/1996 | Abensour et al. | 370/85.13 |
| 5,491,693 | 2/1996 | Britton et al. | 370/85.13 |

OTHER PUBLICATIONS

L. D. Fossett et al. "A Global Networking Project", *Proceedings of the 2nd International Conference on Optical Fiber Submarine Telecommunications Systems*, 1993, pp. 1–6.

L. D. Fossett et al. "Centralized, Two–Tier, and Distributed Configuration Management in Multilateral Networks", *Proceedings of the 6th International Network Planning Symposium*, 1994, pp. 1–6.

ATM Forum "LAN Emulation Over ATM Specification—Version 1.0".

*Primary Examiner*—Douglas W. Olms
*Assistant Examiner*—Min Jung
*Attorney, Agent, or Firm*—Stephen M. Gurey

[57] ABSTRACT

A so-called "ELAN contronect network" is employed to interconnect sub-ELANs to form an ELAN. More specifically, the "ELAN contronect network" is a separate network for interconnecting the servers of the sub-ELANs, where a sub-ELAN is a part of an ELAN having its own LES and BUS that may also be configured as a stand-alone ELAN. Each of the sub-ELANs is connected to the ELAN contronect network via a point-to-point connection-oriented connection, e.g., an asynchronous transfer mode (ATM) connection and the ELAN contronect network is configured to present itself to each of the servers of the sub-ELANs as clients thereof. In a particular embodiment of the invention, the ELAN contronect network includes an address server, a broadcast/route server, a configuration server, multimedia servers, and at least one LAN hub interconnected over a high-speed backbone. The address server contains an address data base for performing address resolution between the at least two addresses of each ELAN end-point in response to requests for such translations. The broadcast/route server receives data packets for broadcast to a different sub-ELAN from which the packets originated and broadcasts the received data packets to at least one other sub-ELAN. The broadcast/route server also recognizes that a packet which is a broadcast packet at layer 2 is actually a request for an address resolution at layer 3. If so, the broadcast/route server collaborates with the address server to perform the necessary address resolution and insures that a response is sent only to the client originating the request.

26 Claims, 10 Drawing Sheets

PRIOR ART

METHOD AND APPARATUS FOR INTERCONNECTING LANS

TECHNICAL FIELD

This invention relates to the interconnection of local area networks (LANs) and subportions thereof.

BACKGROUND OF THE INVENTION

The current embedded base of data networks are based on IEEE 802 Local Area Networks, i.e., so-called "Legacy LANs". These Legacy LANs are so-called "connectionless" because network entities exchange packets without establishment of a layer-2 connection. Many existing and emerging applications are designed to run primarily on Legacy LANs. These applications reside on top of so-called "layer-2" and "layer-3" protocols such as Medium Access (MAC) and Internet Protocol (IP), respectively. As is well known in the art, the layers referred to are those of the international standards organization (ISO) seven layer networking reference model.

Asynchronous transfer mode (ATM) with its a) fixed size cell switching, b) sealability from few megabits to hundreds of megabits, c) ability to offer guaranteed quality of service (QoS) on a per connection basis, and d) connection orientation, is viewed as the enabling technology for high-speed multimedia networking. Therefore, it is desired in the art to interconnect Legacy LANs and ATM end-stations, to themselves and to each other, using ATM. This has been achieved in the prior art in a variety of ways.

Figure 1:
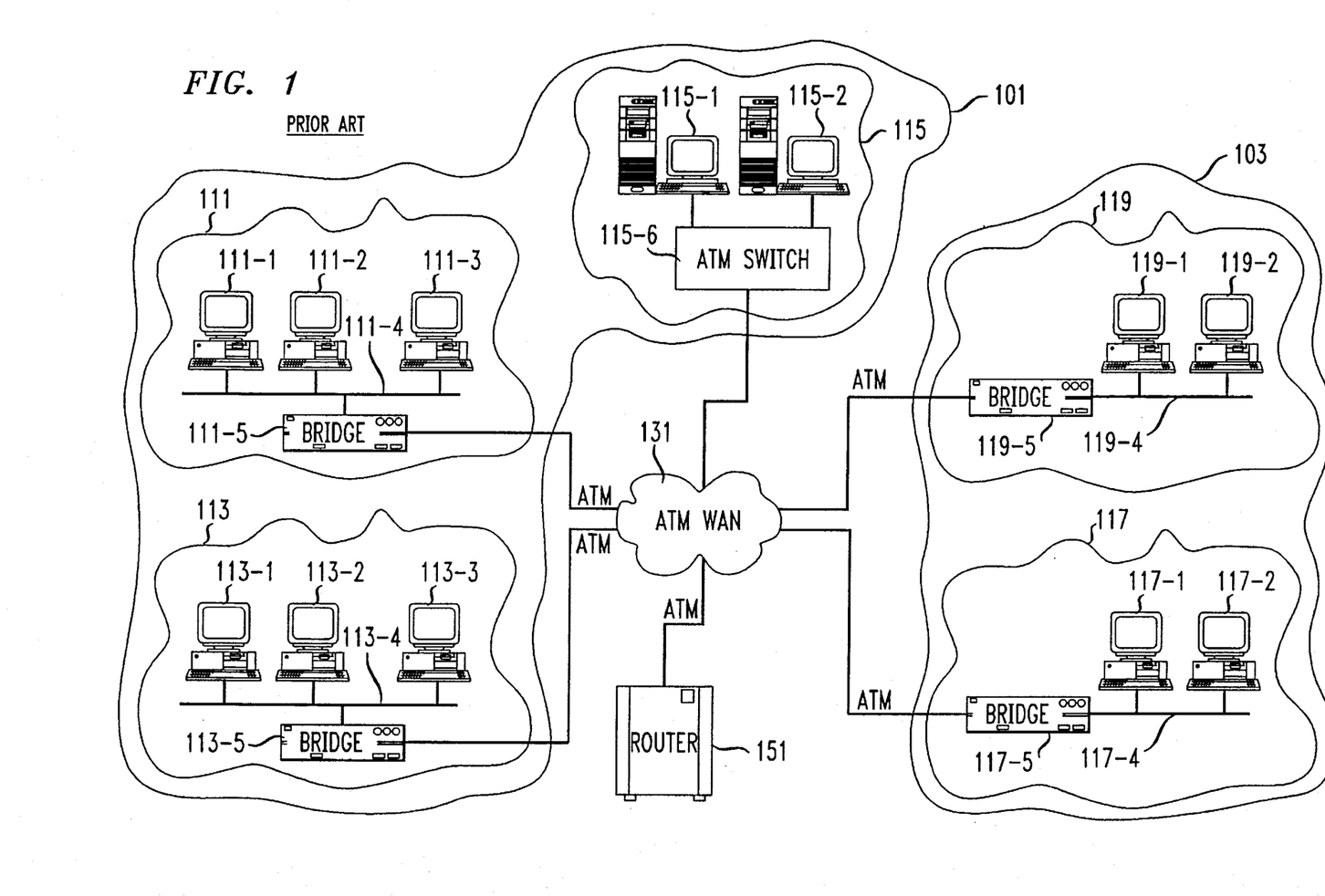
FIG. 1 shows two small prior art networks, each representing a different logical subnet at layer-3.

To describe the existing solutions, consider the example shown in FIG. 1 of two small networks 101 and 103, each representing a different logical subnet at layer-3. LAN 101 has sites 111, 113, and 115 which are interconnected through an ATM wide area network (WAN) 131. Hosts 111-1, 111-2 and 111-3 of site 111 are connected via Ethernet 111-4, hosts 113-1, 113-2, and 113-3 of site 113 are connected via Ethernet 113-4, and ATM hosts 115-1 and 115-2 are connected to an ATM switch 115-6 at site 115. Similarly structured, the second network, LAN 103, has only two hosts per Ethernet site.

A classical method for interconnecting these sites is so-called "bridging and routing". Consider the case of host 111-1 sending a data packet to the MAC address of host 113-2. All stations on Ethernet 111-4, and consequently, bridge 111-5 receives the packet. Bridge 111-5 a) builds broadcast ATM connections to bridge 113-5, hosts 115-1 and 115-2; b) encapsulates host 111-1's data packet on top of the ATM layer, and c) sends it over the ATM connections.

Bridge 113-5, hosts 115-1 and 115-2 receive the information transmitted over the respective ATM connections. Bridge 113-5 strips of the ATM encapsulation, converts the ATM cells into a MAC packet, and sends it to Ethernet 113-4. Thus, all stations on Ethernet 113-4, and consequently, host 113-2 receives the data packet. Hosts 115-1 and 115-2 ignore the received data packet since it is not addressed to them.

Inter-LAN communication according to this technique is achieved through the use of external router 151, since networks 101 and 103 are in different layer-3 subnets. For example, if host 117-1 wants to communicate with host 111-1, host 117-1 sends a data packet to the MAC address of router 151, in which case bridge 117-5 builds an ATM connection to router 151 and sends an ATM encapsulated data packet thereto. Router 151 forwards the packet to bridge 111-5.

A deficiency of this method is that, since it is based on a broadcast principle and thus mimics shared-medium operations, all data packets are broadcast to all ATM destinations, thereby flooding the network with broadcast traffic. Another deficiency is that the broadcast nature of the technique virtually requires a mesh network between all bridges and ATM hosts within a LAN, and all inter-LAN traffic must pass through router 151.

The ATM Forum has developed another bridging solution called LAN Emulation (LANE). LANE relies on a LAN Emulation Server (LES), which performs ATM-to-MAC address resolution, i.e., translation, and a Broadcast and Unknown Server (BUS), which performs data broadcast. The above-described example operates in a LANE environment as follows.

Figure 2:
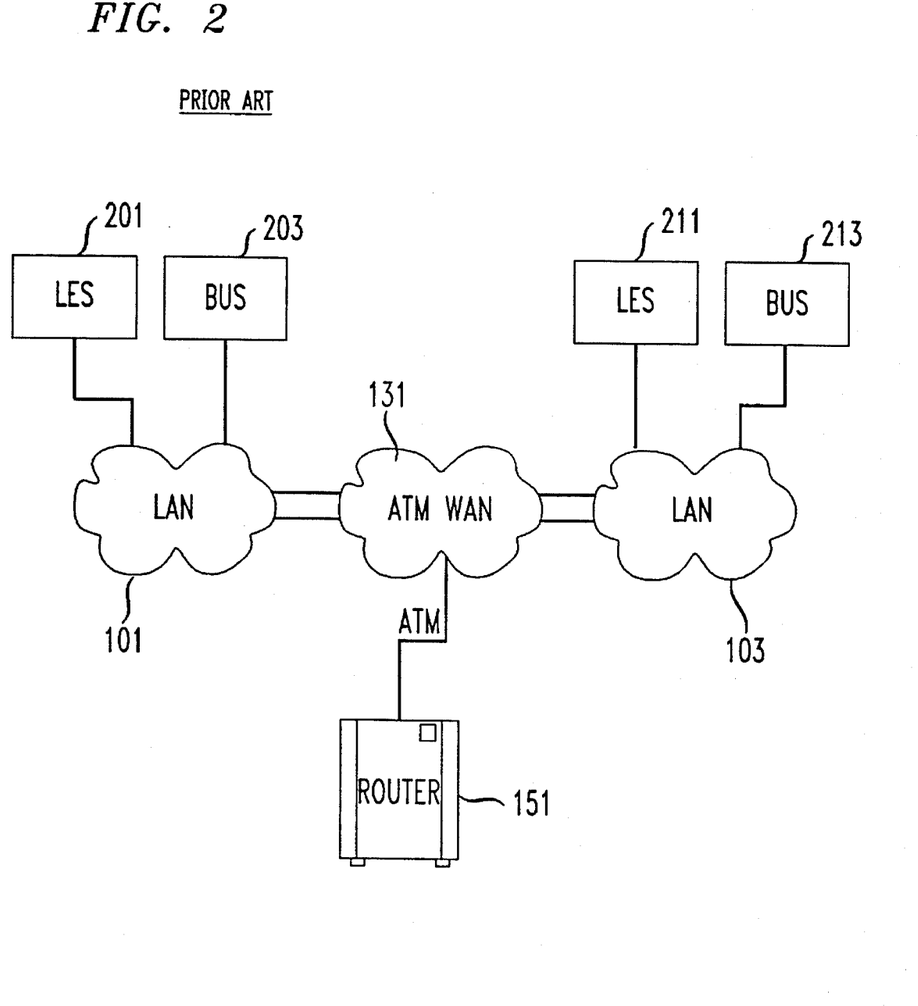
FIG. 2 shows prior art LAN emulation in which the LANS of FIG. 1 are served by various servers, i.e., LES and BUS.

LAN 101 and LAN 103 constitute two different ELANs. As shown in FIG. 2, LAN 101 is served by LES 201 and BUS-203 while LAN 103 is served by LES 211 and BUS 213. As in the previous technique, host 111-1 transmits a data packet with the MAC address of host 113-2. All stations on Ethernet 111-4, and consequently, bridge 111-5, receive, the data packet. Bridge 111-5 either contains within its own information the ATM address of host 113-2, or, if not, it establishes an ATM connection to LES 201 and transmits thereto a so-called "LE_ARP_request" message to obtain the ATM address of host 113-2. The LE_ARP request is defined in the ATM Forum's LAN Emulation Over ATM Specifications, Version 1.0, which is incorporated herein by reference and the contents of which are well known by those skilled in the art.

If LES 201 contains within its own information the requested address, it responds by transmitting it to bridge 111-5. Bridge 111-5 then builds an ATM connection to bridge 113-5, and transmits thereto the data packet. Otherwise, LES 201 broadcasts an LE_ARP_Request message requesting the ATM address of host 113-2 to all other LAN Emulation Clients (LECs) in ELAN 101, namely bridge 113-5, hosts 115-1 and 115-2. Generally speaking, LAN emulation clients (LEC) are end-stations or bridges that are directly connected to an ATM network. Bridge 113-5 responds to LES 201 with its own ATM address, because it is serving host 113-2, the host whose MAC address has been specified. Here, bridge 113-5 is called a "Proxy LEC", since it represents multiple end-point addresses, e.g., the MAC addresses of hosts 113-1, 113-2, and 113-3. For a more detailed description of the definitions of LEC and proxy LEC reference may be made to the above-mentioned ATM Forum's LAN Emulation Over ATM Specifications, Version 1.0.

Broadcast data packets, such as a so-called "ARP_Request", are forwarded to a BUS, which in turn broadcasts them to all LECs. "ARP_Requests" are defined in Bell Communications Research (Bellcore) request for comments (RFC) 826, which is incorporated herein by reference. Also, data packets are sent to a BUS until a direct ATM connection is established to the target address within the LAN.

Similar to the previous example, the communications between two Emulated LANs is done via external router 151. Bridge 117-5 receives a data packet from host 117-1 to the MAC address of router 151. Either bridge 117-5 has the ATM address of router 151, or it requests the address from LES 211. After obtaining the ATM address of router 151, bridge 117-5 builds an ATM connection thereto, and transmits the data packet over the connection.

Either router 151 has the ATM address of bridge 111-5, or it requests the address from LES 201. Router 151 then builds an ATM connection to bridge 111-5, and send thereto the data packet. The data packet will be received by bridge 111-5 and passed to hosts 111-1, 111-2 and 111-3. Thus, disadvantageously, all inter-LAN packets must pass through router 151, which may become a communications bottleneck.

A third method builds upon LANE, but incorporates the routing function as well as bridging function into a so called multi-layer LAN switch. Fundamentally, there are three major functions associated with routing: 1) routing, i.e., determination of the layer-3 address of the next-hop-router along the path to the target address, 2) address resolution or translation, i.e. determination of a router's ATM address corresponding to its layer-3 address, and 3) data forwarding, i.e., relaying data packet from one port of the router to another port. A traditional router performs functions (1) and (3) while function (2) is required because an ATM connection must be established between adjacent ATM router hops or to the target ATM address. A multi-layer switch performs only function (3), i.e. data forwarding.

A route server is used to store next-hop router's layer-3 address, and an address resolution protocol (ARP) server is used to resolve, i.e., translate, layer-3 addresses to ATM addresses. Sometimes these functions are merged into one server, a so-called "Route/ARP Server". With a multi-layer LAN switch, the intra-LAN communication is performed just as in LANE using the local LES and BUS of each ELAN. However, inter-LAN communication is different. In the following description, Router 151 of FIG. 2 is assumed to undertake the role of a Route/ARP server.

If host 111-1 wants to talk to host 117-2, then bridge 111-5 acts as a router, obtains the next-hop-routers IP address from the route server 151, and obtains the corresponding ATM address from ARP server 151. It then establishes an ATM connection directly to bridge 117-5 and sends the data packet.

This method is more efficient than using external router since the external router hop is eliminated. Further efficiency is obtained by each multi-layer switch performing fast data forwarding both for layer-2 and 3 packets, while complicated route determination and address resolution functions are logically removed from the switches. Although the Route Server decouples the routing from data forwarding, it only can serve a few logical subnets, and is thus not suited to cover large number of logical subnets. As the number of subnets governed by a single route server increases the efficiencies provided with this approach greatly diminish, since several router hops become practically unavoidable.

Thus, the existing LANE and Route/ARP Server methods work effectively only for small scale local networks. The LANE solution requires one LES and BUS per ELAN, and one ELAN per subnet. If an ELAN becomes large, there will be large numbers of broadcast messages transmitted, which results in a degradation of network performance. Similarly, a single route/ARP Server approach is not suitable for large scale networks, as it also creates performance bottlenecks.

Another problem with the foregoing approaches is the difficulty of handling frequent moves and changes between ELANs when an ELAN may extend beyond corporate boundaries and may span several remote sites. For example, during the life of a project it may be useful for LAN 101 and LAN 103 to form a single LAN. However, with the above solutions, the assigning of hosts to a single LAN is not easily manageable, except in the case of relatively small local networks.

SUMMARY OF THE INVENTION

The forgoing problems with interconnecting ELANs are overcome, in accordance with the principles of the invention, by employing a so-called "ELAN contronect network" which is a separate network for interconnecting the servers of the sub-ELANs, where a sub-ELAN is a part of an ELAN having its own LES and BUS that may also be configured as a stand-alone ELAN. Each of the sub-ELANs is connected to the ELAN contronect network via a point-to-point connection-oriented connection, and the ELAN contronect network is configured to present itself to each of the servers of the sub-ELANs as clients thereof. Advantageously, the number of connections required to interconnect the separate sub-ELAN servers, so as to form an ELAN containing more than one sub-ELAN, is reduced from an order of squared ($N^2$) to an order of linear (KN) with respect to the number of sub-ELANs that are interconnected. Also advantageously, the number of broadcast messages transmitted between different sub-ELANs in an ELAN is reduced from the total number of clients in all of the sub-ELANs that are interconnected to form the ELAN to the number sub-ELANs in the ELAN minus one by only transmitting from the ELAN contronect network one broadcast message to each sub-ELAN, of the ELAN, other than the message originator. Further advantageously, the sub-ELANs can be coupled to the ELAN contronect network without changes to the hardware or software of their servers provided there is a capacity to attach another client.

In a particular embodiment of the invention, the ELAN contronect network includes an address server and a broadcast/route server interconnected over a high-speed backbone. Also connected to the high-speed backbone is at least one LAN hub, which connects to at least one server of at least one of the ELANs.

The address server contains an address data base for performing address resolution, i.e., translation, between the at least two addresses of each ELAN end-point in response to requests for such translations. The broadcast/route server receives data packets for broadcast to a different sub-ELAN from which the packets originated and broadcasts the received data packets to at least one other sub-ELAN. The broadcast/route server also recognizes that a packet which is a broadcast packet at layer 2 is actually a request for an address resolution at layer 3. If so, the broadcast/route server collaborates with the address server to perform the necessary address resolution and insures that a response is sent only to the client originating the request. Advantageously, the number of broadcast messages is reduced to one from a number equal to the number of clients of the ELAN in which the address resolution request has originated. Layer-3 routing may also be performed by the broadcast/route server.

Optionally, the ELAN contronect network also includes a configuration server and one or more multimedia servers.

DETAILED DESCRIPTION

Figure 3:
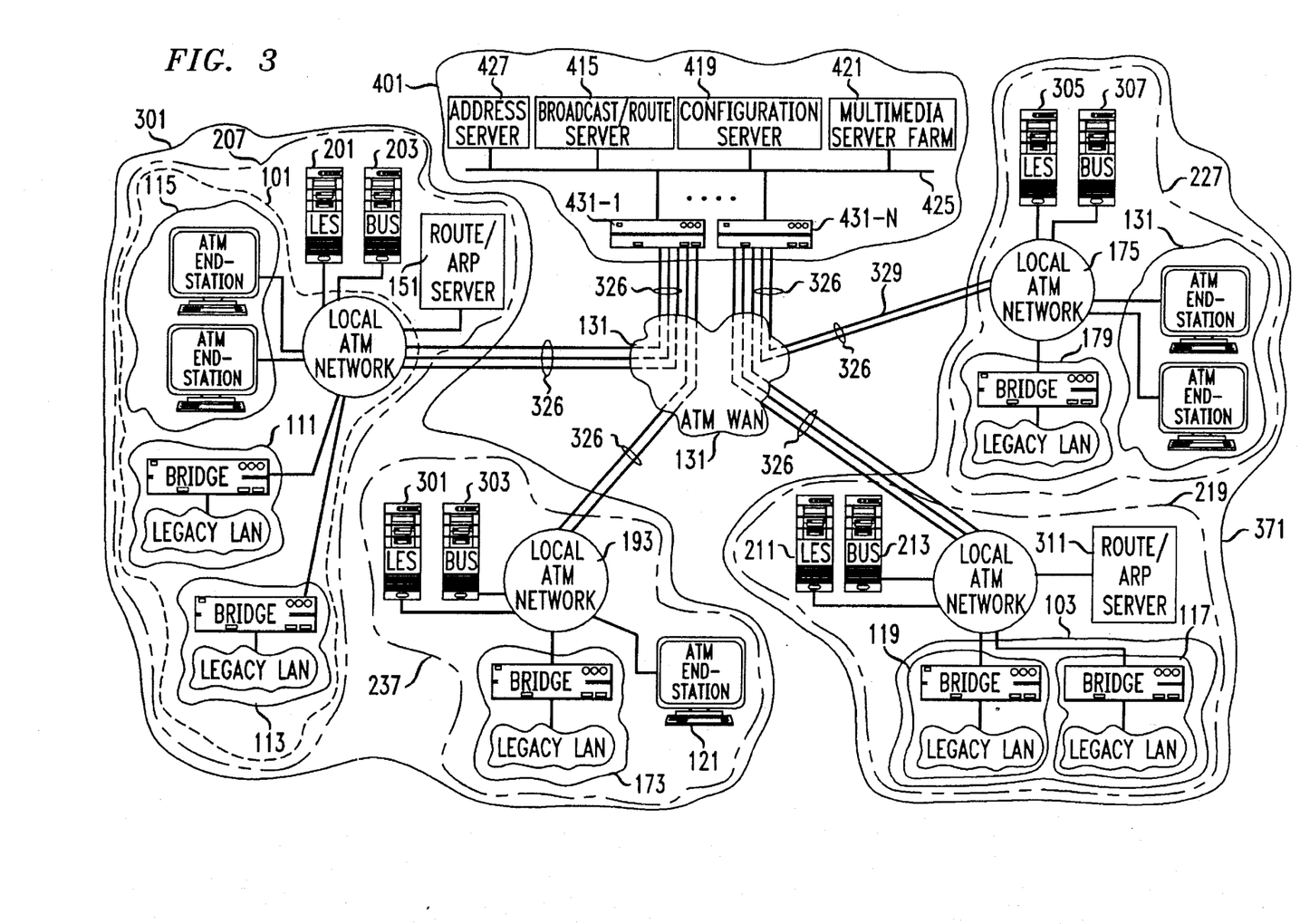
FIG. 3 shows an exemplary embodiment of the invention in which an ELAN contronect network is arranged to interconnect several sub-ELANs in accordance with the principles of the invention.

FIG. 3 shows an exemplary embodiment of the invention in which ELAN contronect network 401 is arranged for interconnecting the servers of sub-ELANs 207, 219, 227 and 237 in accordance with the principles of the invention. Each of sub-ELANs 207, 219, 227 and 237 is connected to ELAN contronect network 401 via a point-to-point connection-oriented connection through asynchronous transfer mode (ATM) wide area network 131. ELAN contronect network 401 is configured to present a) address server 247 and b) broadcast/route server 215 to each of servers 201, 203, 211, 213, 301, 303, 305, and 307 of the sub-ELANs as LECs, and more particularly, as proxy LECs thereof. Address server 427 and broadcast/route server 215 are "proxy" in that they represent all other end-station addresses not within each respective sub-ELAN. Advantageously, the number of connections required to interconnect the separate ELAN servers is reduced from an order of squared ($N^2$) to linear (KN) with respect to the number of ELANs that are interconnected. Also advantageously, the number of broadcast messages transmitted between different sub-ELANs in an ELAN is reduced from the total number of clients in all of the sub-ELANs that are interconnected to form the ELAN to the number sub-ELANs in the ELAN minus one by only transmitting from the ELAN contronect network one broadcast message to each sub-ELAN, of the ELAN, other than the message originator. Further advantageously, the ELANs can be coupled to the ELAN contronect network 401 without changes to the hardware or software of their servers provided there is a capacity to attach another client.

In particular, FIG. 3 shows sub-ELAN 207, sub-ELAN 219, sub-ELAN 227, and sub-ELAN 237. Sub-ELAN 207 includes prior art network 101 and associated LAN emulation server (LES) 201, broadcast and unknown server (BUS) 203 and route/address resolution protocol (ARP) server 151. Sub-ELAN 219 includes prior art network 103 and its associated servers LES 211, BUS 213, and route/ARP 311, which substitutes for access to router 151 of FIG. 2. Sub-ELAN 227 includes bridge and legacy LAN 179, ATM end-stations 131, ATM switch 175, and associated servers LES 305 and BUS 307. Sub-ELAN 237 includes bridge and legacy LAN 173, ATM end-station 121, ATM switch 193, and associated servers LES 301 and BUS 303.

ELAN contronect network 401 includes a) address server 427, b) broadcast/route server 415, c) optional configuration server 419, d) optional multimedia server farm 421, and e) LAN hubs 431 which includes LAN hub 431-1 through 431-N, connected via high speed backbone 425. Address server 427 performs address resolution, i.e. address translation, between various network end-point layer-3 and layer-2 addresses. As is well known in the art, each network end-point, i.e., any unit connected to send and receive data packets, may have more than one address, i.e. an identifier, by which it is known. Thus, a first end-point may know a particular address for a second end-point but not the second end-point's other corresponding address which may be required in order to exchange data packets with the second end-point. The information necessary to perform such address translation is stored in an address table. Table 1 is an exemplary address table. If address server 427 does not contain within itself the necessary information to perform a required address translation, i.e., the necessary entries are not present in its address table, address server 427 is able to engage the necessary processes in order to obtain and store within itself the necessary information. Thereafter address server 427 will be able to directly perform the required address translation.

TABLE 1

| ATM address | Layer-2 address | Layer-3 address |
|---|---|---|
| ATM-111-5 | MAC-111-01 | IP-111-01 |
| ATM-111-5 | MAC-111-02 | IP-111-02 |
| . | . | . |
| . | . | . |
| . | . | . |
| ATM-111-5 | MAC-111-0N | IP-111-0N |
| ATM-115 | MAC-115 | EP-115 |

Broadcast/route server 415 performs several functions relating to communicating to more than one end-point at a time. In particular broadcast/route server 415 receives a data packet from a sub-ELAN of a particular ELAN and sends it to one or more sub-ELANs in the same or a different ELAN. Broadcast/route server 415 also recognizes that a data packet which is indicated to be a broadcast packet at layer-2 actually contains a layer-3 address resolution request. When such data packets are recognized, broadcast/route server 415 communicates with address server 427 to obtain the requested address. Broadcast/route server 415 then transmits the translated address directly to the end-point which originated the data packet. Advantageously, doing so eliminates the need for additional transmissions of the data packet.

An optional function of broadcast/route server 415 is to act as a router for packets addressed to it by a router/ARP server and requesting routing of the packets. Typically such requests are performed at layer 3, and require a packet to be sent to an ELAN other than the ELAN of the packet-originating end-point. Advantageously, since broadcast/route server 415 is aware of all the layer-3 addresses of those end points that subscribe to service by ELAN contronect network 401, packets can be routed to the ultimate destination in no more than two hops, i.e. via the route/ARP server of the sub-ELAN from which the packet originated and then via broadcast/route server 415.

Optional configuration server 419 operates to group one or more sub-ELANs into an ELAN regardless of the locations of the sub-ELANs. Configuration server 419 can serve more than one ELAN. For example, configuration server 419 has configured sub-ELAN 207 and sub-ELAN 237 into ELAN 301. Likewise, configuration server 4 19 has configured sub-ELAN 227 and sub-ELAN 2 19 together into ELAN 371.

Configuration server 419 operates by communicating with address server 427 and broadcast/route server 415 to establish connections between the servers of the sub-ELANs to be joined into a single ELAN while ensuring the disjointedness of the distinct ELANs. One method for achieving this result is to group together at least one set of the addresses corresponding to servers serving the sub-ELANs of an ELAN in a so called "configuration table". For example, the addresses employed may be the ATM addresses. Packets originating from an address within a particular group of sub-ELANs may only be transmitted to end-points having addresses within the same group.

By using the same type of arrangement, configuration server 419 also controls access by the various ELANs and sub-ELANs to services provided by multimedia server farm 421. This will be further described hereinbelow.

Optional multimedia server farm 421 includes one or more multimedia servers for providing a variety of multimedia services. The particular multimedia services available to any particular end-point depends on the services to which the ELAN to which the end-point belongs, has subscribed. Exemplary services provided by multimedia server farm 421 include a) multipoint video teleconferencing, b) multipoint whiteboarding, c) video-on-demand, and d) delayed playback of retrieved files. In order to obtain such services, an end-point requests a connection to multimedia server farm 421 as an end-point itself, with the request specifying the particular service required.

LAN hubs 431 provide conversion from ATM to the protocol of high-speed backbone 425. For each LES, BUS, and route/ARP server in each of the sub-ELANs there is a single ATM connection to one of LAN hubs 431. These are connections 326.

ATM connections 326 traverse a so-called "local ATM network" which is the portion of an ATM network that is seen by all end-stations of the sub-ELAN and is used for the LAN emulation therein. ATM connections 326 also traverse ATM wide-area network (WAN) 131, which provides interconnection from each local ATM network to LAN hubs 431. The local ATM networks and ATM wide-area network 131 may all be logical parts of a single ATM network. The local ATM networks and ATM wide-area network 13 1 carry properly addressed packets directly between end-points.

FIGS. 4, 5, 6, and 7, when connected together, show an exemplary procedure for processing packets in the system of FIG. 3, including the performing of address resolution and forwarding data packets to a specified address, in accordance with the principles of the invention. The process is entered in step 501 when an end-station has prepared a packet for transmission. Next, conditional branch point 503 tests to determine if the prepared packet is a routable packet i.e., the packet has a layer-3 protocol. If the test result in step 503 is NO, indicating that the packet is not routable, control passes to conditional branch point 505, which tests to determine if the packet is destined to an end-station within the same ELAN. If the test result in step 505 is NO, control passes to step 507 and the process is exited.

Figure 4:
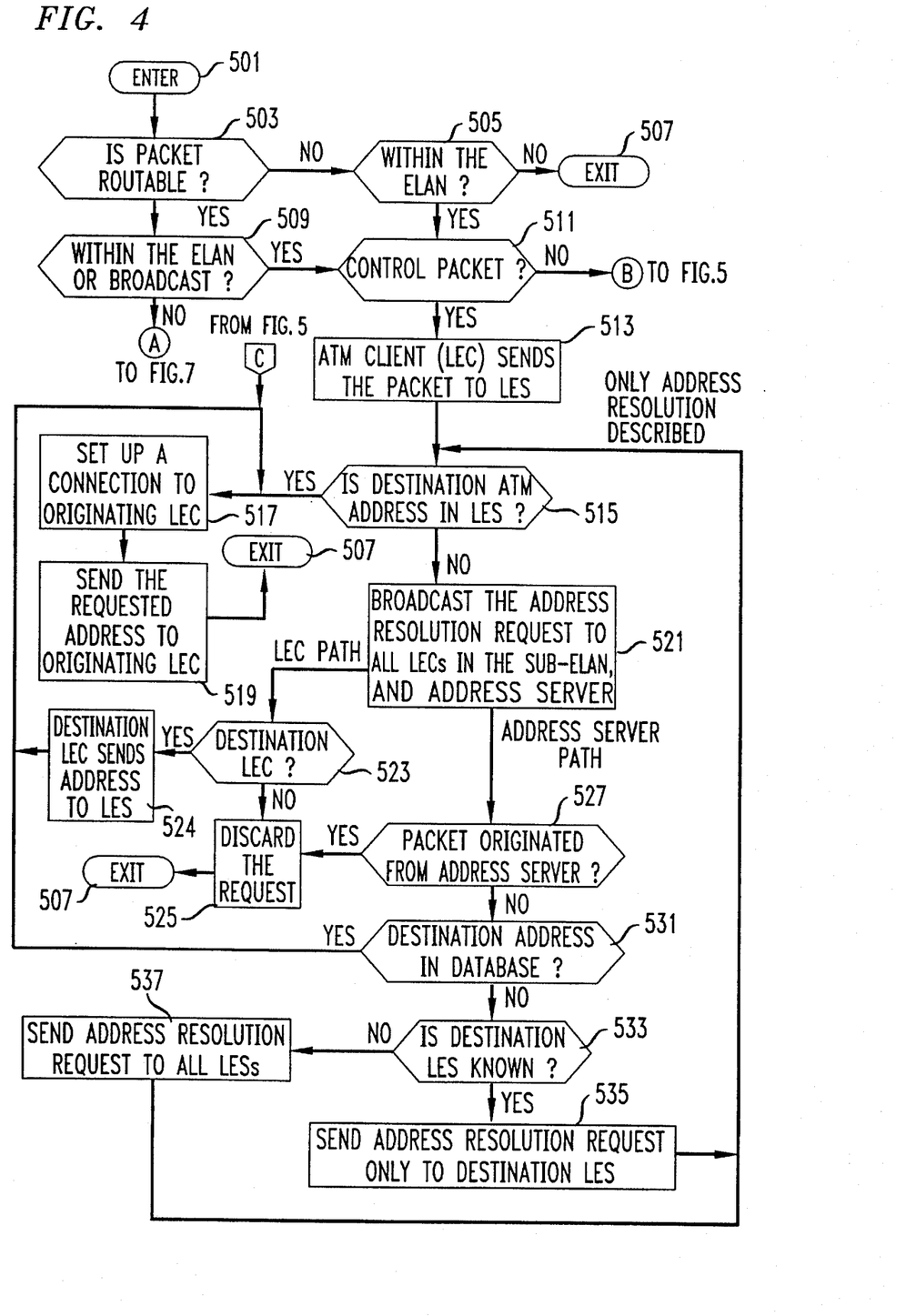
FIGS. 4, 5, 6, and 7, when connected together, show an exemplary procedure for processing packets in the system of FIG. 3, in accordance with the principles of the invention.

If the test result in step 503 is YES, indicating that the packet is routable, control passes to conditional branch point 509, which tests to determine if the packet is destined to an end-station within the same ELAN or the packet is a broadcast packet. If the test result in step 509 is YES or the test result in step 505 is YES, control passes to conditional branch point 511, which tests to determine if the packet is a control packet. If the test result in step 511 is YES, control passes to step 513, in which the end-station transmits the packet to the LES of the sub-ELAN to which it is connected.

Steps 501–513 are performed in an ATM end-station when it is originating a packet. An ATM end-station can be a stand-alone ATM end-station, such as ATM end-station 131, or it may be an ATM to Legacy LAN converter, such as bridge 111-5 contained in site 111. Such ATM end-stations are known in the art as LAN emulation clients (LEC).

Control then passes to conditional branch point 515, which tests to determine if the ATM address of the destination of the packet is found within the LES. If the test result in step 515 is YES, control passes to step 517, in which the LES of the sub-ELAN establishes a connection to the packet-originating LEC if one does not already exist. Next, in step 519, the LES transmits the requested ATM address to the packet-originating ATM end-station. The process then exits in step 507. In this instance, steps 517-519 are performed by the LES of end-station's sub-ELAN.

If the test result in step 515 is NO, indicating that the ATM address of the destination is not contained within the LES of the sub-ELAN of the packet originating LEC, control passes to step 521, in which the LES broadcasts an address resolution request to all LECs of the sub-ELAN, and thus address server 427 of ELAN contronect network 401, which appears as a LEC to the LES, in accordance with the principles of the invention.

Next, the following process steps are undertaken substantially in parallel by each of the LECs in the sub-ELAN and a separate set of process steps is also undertaken in address server 427.

Steps 523 through 525 are performed in each LEC. On receipt of the broadcast message each LEC tests to determine if it is the destination LEC, in conditional branch point 523. If the test result in conditional branch point 523 is NO, indicating that the LEC is not the destination LEC, control passes to step 525 and the packet including the resolution request is discarded. Control then passes to step 507 and the process is exited. If the test result in step 523 is YES, indicating that the LEC is the destination LEC, control passes to step 524, in which the LEC sends a packet, including the requested address, to the LES of the sub-ELAN which originated the address resolution request. Thereafter, control passes back to step 517, and the process continues as described above in the LES.

In response to receipt of the address resolution request in address server 427, address server 427 tests to determine, in conditional branch point 527, if it itself originated the address resolution request packet. If the test result in step 527 is YES, control passes to 525, in which address server 427 discards the packet containing the request. The process then exits in step 507.

If the test result in step 527 is NO, control passes to conditional branch point 531, in which address server 427 tests to determine if the requested destination address is contained within its database. If the test result in step 531 is YES, control passes back to step 517, and the process continues as described above, except that steps 517 and 519 are performed by address server 427 instead of the LES of the sub-ELAN from which the address resolution request originated.

If the test result in step 531 is NO, control passes to conditional branch point 533, which tests to determine if the LES serving the destination is known to address server 427. If the test result is step 533 is YES, control passes to step 535, in which, in accordance with to the principles of the invention, address server 427 transmits an address resolution request only to the LES of the sub-ELAN serving the destination. If the test result in step 533 is NO, control passes to step 537, in which an address resolution request is sent to all LESs serving the ELAN, preferably except the LES of the sub-ELAN originating the request. After completion of step 535 or step 537, control passes back to step 515, in which each of the LESs receiving a message from address server 427 continues executing the process at step 515 as described above.

If the test result in step 511 is NO, indicating that the packet is a data packet, control passes to conditional branch point 539 (FIG. 5), which tests to determine if the destination address is known to the LEC originating the data packet. If the test result in step 539 is YES, control passes to step 541, which tests to determine if the packet is a unicast packet, i.e., a packet destined to a single end-point. If the test result in step 541 is YES, control passes to step 545, in which the originating LEC establishes a connection to the destination address, if one does not exist already. Control then passes to step 547, in which the data packet is transmitted over the connection. The process then exits in step 507.

Figure 5:
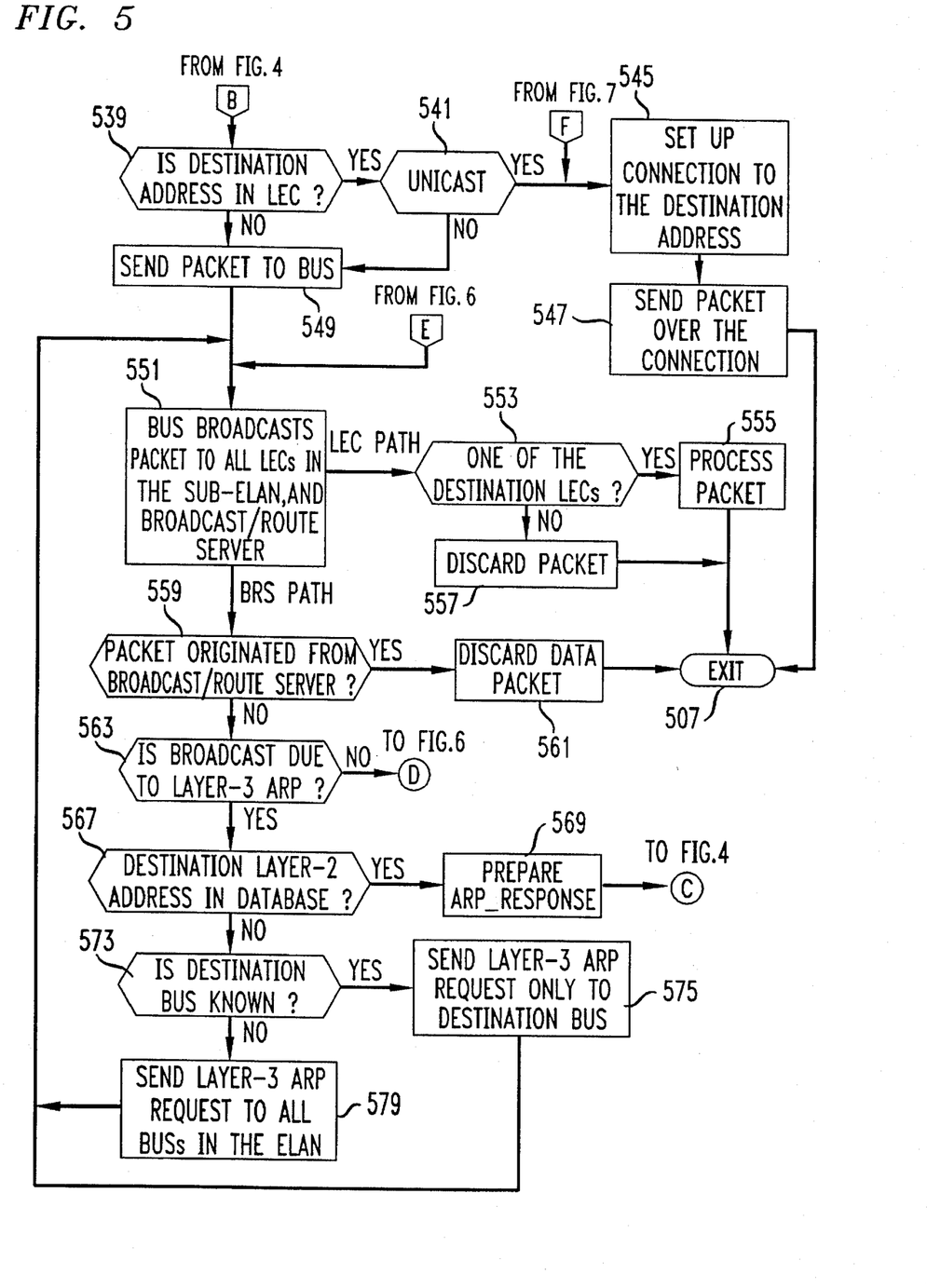

If the test result in either step 539 or step 541 is NO, indicating that either the originating LEC does not know the destination address or the packet is destined for more than one destination address, i.e., a broadcast or multicast packet, control passes to step 549, in which the packet is transmitted to the BUS of the sub-ELAN serving the LEC originating the data packet. Next in step 551, the receiving BUS broadcasts data packet to all LECs, in the sub-ELAN and, consequently, accordance with the principles of the invention, to broadcast/route server 415 in ELAN contronect network 401, which is a proxy LEC thereof. As a result, two distinct parallel paths thereafter result, the first path a) including steps 553 through 557 and b) being performed in each LEC receiving the broadcast data packet, and the second path a) including steps 559 through 579 and b) being performed in broadcast/route server 415.

When control passes to step 553, the LEC receiving the broadcast packet tests to determine if it is one of the destination LECs. If the test result in step 553 is NO, control passes to step 557, in which the packet is discarded. The process then exits in step 507. If the test result in step 553 is YES, control passes to step 555, in which the receiving LEC processes the packet, e.g., examines the packet header and transmits the packet to higher layers. The process then exits in step 507.

When control passes to conditional branch point 559, because broadcast/route server 415 receives a broadcast packet, broadcast/route server 415 tests to determine if it had originated the broadcast packet. If the test result in step 559 is YES, control passes to step 561 and the data packet is discarded. The process then exits in step 507.

If the test result in step 559 is NO, control passes to conditional branch point 563, which tests to determine, in accordance with an aspect of the invention, if the packet is a broadcast packet at layer-2 that originated in response to a layer-3 address resolution protocol (ARP) request, i.e., a request for address translation at layer-3. If the test result in step 563 is YES, control passes to conditional branch point 567, which tests to determine if the layer-2 address of the destination is contained within address server 427. This step is performed by broadcast/route server 415 querying address server 427 and receiving a response containing the desired address therefrom, if it is available. If the test result in step 567 is YES, control passes to step 569, in which broadcast/ route server 415 prepares an ARP_Response message including the requested address. Control then passes back to step 517, and the process continues as described above, except that steps 517 and step 519 are performed by broadcast/route server 415 and the requested address transmitted is that of the ARP_Response.

If the test result in step 567 is NO, indicating that the destination layer-2 address is not within address server 427, control passes to conditional branch point 573, which tests to determine if the BUS serving the destination LEC is known. If the test result in step 573 is YES, in accordance with an aspect of the invention, broadcast/route server 415 transmits a layer-3 ARP request only to the BUS serving the destination LEC. If the test result in step 573 is NO, control passes to step 579, in which the layer-3 ARP request is transmitted to all the BUSs of the ELAN. Upon conclusion of the performance of steps 575 or 579, control passes back to step 551, in which each of the BUSs receiving the request from broadcast/route server 415 process the request as described above.

If the test result in step 563 is NO, indicating that the packet is a conventional broadcast packet, control passes to conditional branch point 581 (FIG. 6), which tests to determine if the packet is a broadcast packet. If the test result in step 581 is YES, indicating that the packet is a broadcast packet, control passes to step 583, in which broadcast/route server 415 broadcasts the packet to all the BUSs of the ELAN from which the packet originated. Control then passes back to step 551 (FIG. 5), and the process continues as described above when each of the BUSs receives its copy of the broadcast packet.

Figure 6:
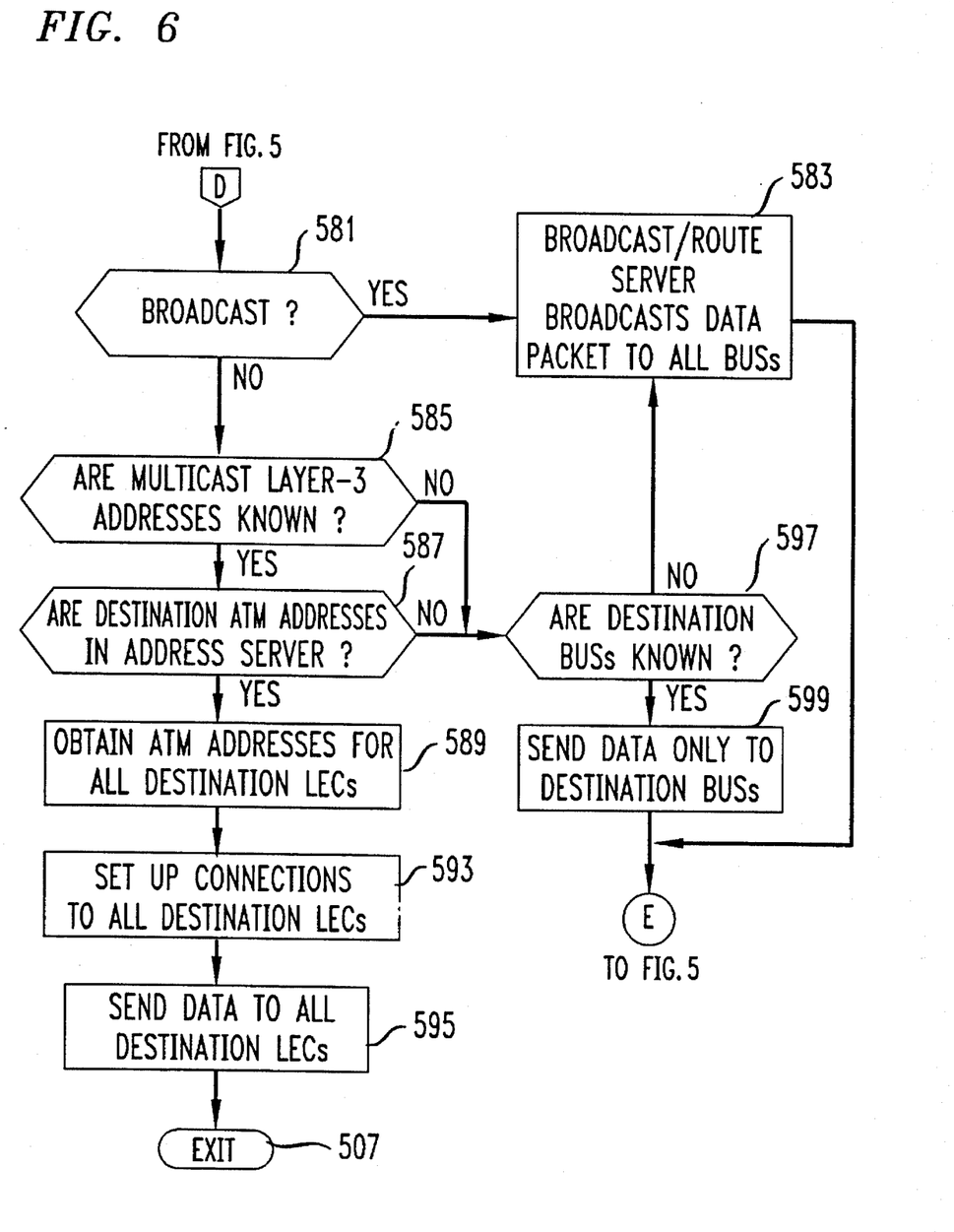

If the test result in step 581 is NO, indicating that the packet is a multicast packet, control passes to conditional branch point 585, which tests to determine if the multicast layer-3 addresses of the multicast packet are known. If the test result in step 585 is YES, control passes to conditional branch point 587, which tests to determine if the layer-2 addresses that correspond to each of the multicast layer-3 addresses are stored in address server 427. If the test result in step 587 is YES, control passes to step 589, in which broadcast/route server 415 obtains the layer-2 addresses for all destination LECs specified in the multicast address, in accordance with an aspect of the invention. Control passes to step 593, in which broadcast/route server 415 establishes a connection from itself to each of the destination LECs for which a connection does not already exist. The data packet is then transmitted by broadcast/route server 415 to each of the destination LECs in step 595, in accordance with an aspect of the invention. The process then exits in step 507. Advantageously, fast multicasting is achieved by transmitting the data packet to only those LECs specified by the multicast address. Also advantageously, the number of packets transmitted for each multicast is reduced from the number of LECs in the ELAN to the number of the LECs specified by the multicast address.

If the test result in step 585 is NO, indicating that the layer-2 addresses corresponding to the multicast layer-3 address are not known, or the test result in step 587 is NO, indicating that one or more of the layer-2 destination addresses is not known, control passes to conditional branch point 597 which tests to determine if the BUSs serving the sub-ELANs that contain one or more of the multicast layer-3 addresses is known. If the test result in step 597 is NO, control passes back to step 583, and the process continues as described above. If the test result in step 597 is YES, control passes to step 599, in which the data packet is transmitted only to the BUSs serving the sub-ELANs that contain one or more of the destination LECs, in accordance with an aspect of the invention. Control then passes back to step 551 (FIG. 5), and the process continues as described above when each of the BUSs receives its copy of the broadcast packet. Advantageously, the foregoing processes can limit the number of packets that must be transmitted to execute the multicast transmission of a packet when the particular LECs are not known.

If the test result in step 509 (FIG. 4) was YES, indicating that the packet is being sent to a destination outside the ELAN to which the originating LEC is connected, control passes to step 601 (FIG. 7), which tests to determine if the destination ATM address is known to the originating LEC. If the test result in step 601 is YES, indicating that the originating LEC has the information necessary to a) establish a direct connection with the destination LEC, should such a connection not already exist and b) to forward the packet thereto, control passes back to step 545, and the process continues as described above.

Figure 7:
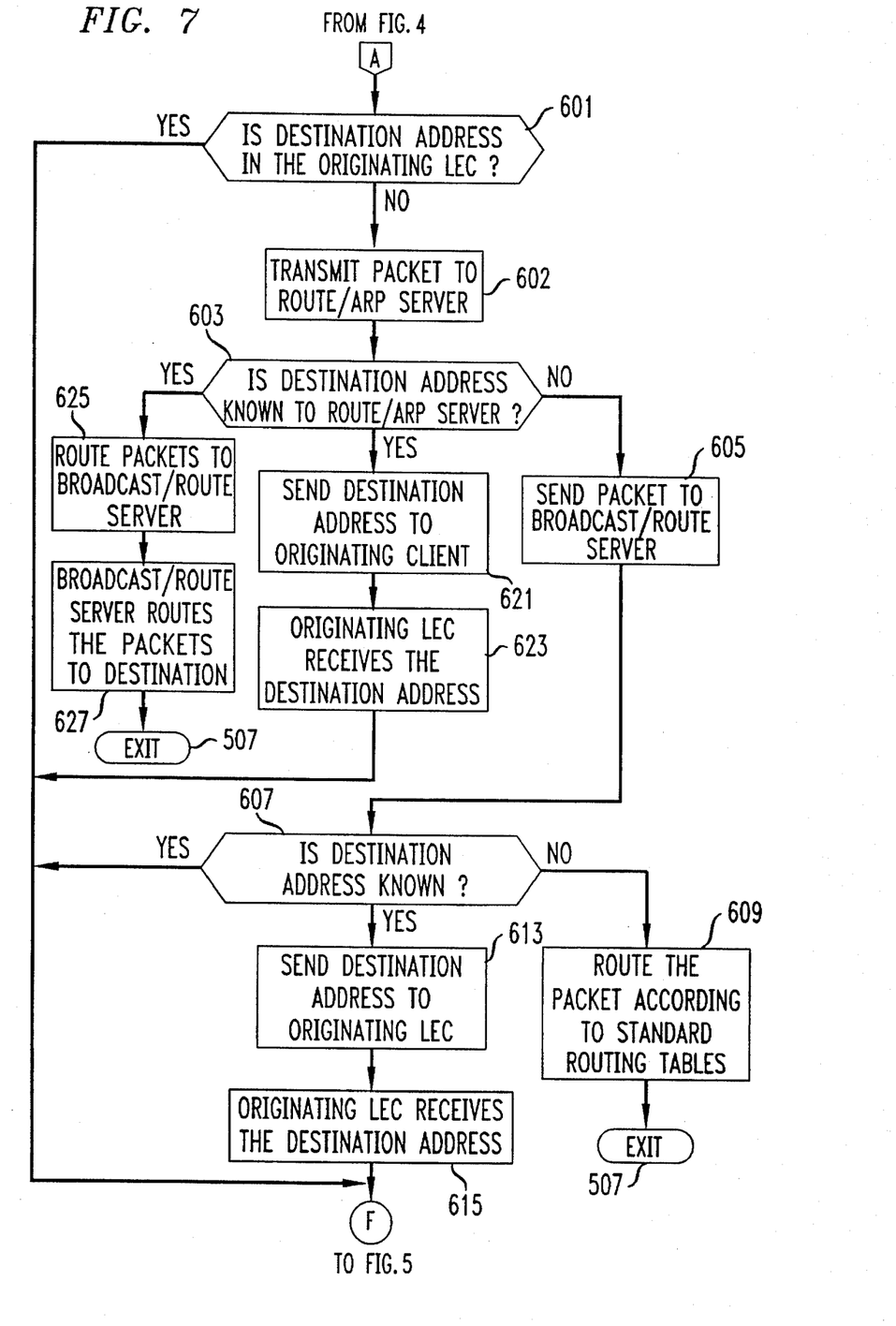

If the test result in step 601 is NO, indicating that the destination ATM address is 1) unknown to the originating LEC and 2) outside the originating ELAN, control passes to step 602. It is noted that while the following description employs the term "LEC" to indicate an ATM end-station, the ATM end-stations when communicating with destinations that are not part of the same ELAN may use protocols other than the one employed for LAN emulation. One such other protocol is classical IP over ATM. In step 602, the originating LEC transmits the packet to the route/ARP server serving that LEC. It is noted that the route/ARP server for a particular LEC may be located within a) the same sub-ELAN, b) a different sub-ELAN, or c) even a different ELAN. However, it is required that the originating LEC know the address of the route/ARP server and be able to establish a connection thereto.

Control then passes to conditional branch point 603 in which the route/ARP server tests to determine if the address of the destination LEC is known. If the test result in step 603 is NO, control passes to step 605, in which the route/ARP server transmits the packet to broadcast/route server 415, in accordance with an aspect of the invention. Next, in conditional branch point 607, broadcast/route server 415 tests to determine if the destination address is known to it. This step is performed by broadcast/route server 415 communicating with, so as to access information in, address server 427. If the test result in step 607 is NO, this indicates that the destination is not served by ELAN contronect network 401. Therefore, broadcast/route server 415 routes the packet according to standard routing tables, e.g., it forwards the packet to another network not controlled by ELAN contronect network 401 but which may be directly or indirectly attached thereto. The process then exits in step 507.

If the test result in step 607 is YES, indicating that the destination address is known, control passes to both steps 613 and 545 which, along with their subsequent steps, are performed substantially in parallel. In steps 545 and 547, broadcast/route server 415 routes the packet to the destination LEC over a connection. The process then exits in step 507. In step 613, broadcast/route server 415 transmits the destination address to the originating LEC, in accordance with an aspect of the invention. In step 615, the originating LEC receives the destination address from broadcast/route server 415 and stores it. Control then passes back to step 545, which is performed by the originating LEC, and the process continues as described above.

If the test result in step 603 is YES, indicating that the destination address is known within the route/ARP server, control passes to both steps 621 and 625 which, along with their subsequent steps, are performed substantially in parallel. In step 625, the route/ARP server transmits the packet to broadcast/route server 415. Broadcast/route server 415 then routes the packet to the destination LEC in step 627. The process then exits in step 507. It is noted that if the route/ARP server can directly route the packet then it may do so in lieu of steps 625 and 627. In step 621, the route/ARP server transmits the destination address to the originating LEC. In step 623, the originating LEC receives the destination address from the route/ARP server and stores it. Control then passes back to step 545 and the process continues as described above.

Figure 8:
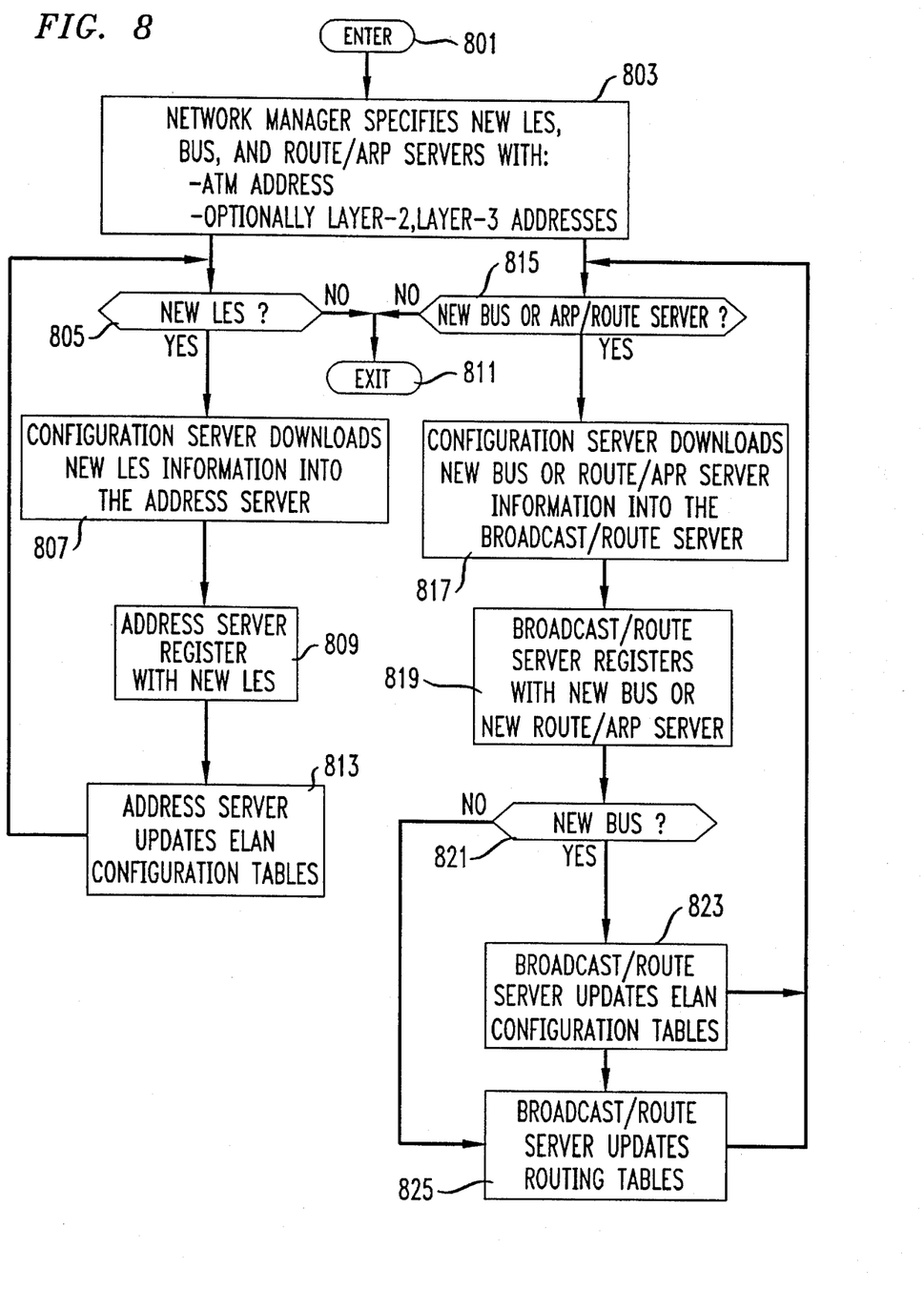
FIG. 8 shows an exemplary process performed by the configuration server of FIG. 3 for adding new LES, BUS, or route/ARP servers in accordance with the principles of the invention.

FIG. 8 shows an exemplary process performed by configuration server 419 for adding new LES, BUS, or route/ARP servers. The process is entered in step 801 when a network manager logs into configuration server 419. Logging in may be performed at a console directly connected to configuration server 419 or it may be performed via a remote access console, which may be located within one of the ELANs served by ELAN contronect network 401. A network manager may manage one or more ELANs that are connected to ELAN contronect network 401 or the network manager may be the system administrator for ELAN contronect network 401 itself.

Next, in step 803, the network manager specifies the new LES, BUS, and route/ARP servers by supplying 1) at least their ATM addresses and 2) optionally, also supplying other layer-2 and layer-3 addresses. The network manager then logs out. Next two separate processes are performed, one for adding new LESs, and the other for adding new BUSs and new route/ARP servers. These processes may be performed in parallel.

For adding new LESs, conditional branch point 805 tests to determine if the network manager has entered information for a new LES. If the test result in step 805 is NO, control passes to step 811, and the process is exited. If the test result in step 805 is YES, control passes to step 807, in which configuration server 419 downloads the new LES information into address server 427. Next, in step 809, address server 427 registers itself with the new LES, i.e., it makes the new LES aware that address server 427 has become a client of the new LES. Address server 427 updates its ELAN configuration tables to associate the new LES with an ELAN in step 813. Exemplary ELAN configuration tables are shown in Tables 2 and 3, and described hereinbelow. Control then passes back to step 805, and the process continues as described above.

Exemplary ELAN configuration tables are shown in Tables 2 and 3. Table 2 is the configuration table for ELAN 301, while Table 3 is the configuration table for ELAN 311. These configurations tables will be readily understandable by those of ordinary skill in the art because of their similarity to those tables used in LESs. Note that in Tables 2 and 3 the ATM, MAC, and IP addresses are shown only to illustrate the concept and do not represent an actual addressing scheme in any of the protocols. Also, note that the same ATM address is used for all stations on a Legacy LAN, since all these stations are connected to the same LAN switch. For example, all stations 111-1 through 111-N have the same ATM address, ATM-111 of bridge 111-5.

TABLE 2

| | ELAN 301 | | | | | | | | |
|---|---|---|---|---|---|---|---|---|---|
| | LES | | | BUS | | | Route/ARP Server | | |
| Sub ELAN Name | Name | ATM address | IP address | Name | ATM address | IP address | Name | ATM | IP |
| Sub-ELAN 207 | LES-201 | ATM-201 | IP-201 | BUS-203 | ATM-203 | IP-203 | Route ARP-151 | ATM-151 | IP-151 |
| Sub-ELAN 237 | LES-301 | ATM-301 | IP-301 | BUS-303 | ATM-303 | IP-303 | Route ARP-151 | ATM-151 | IP-151 |

TABLE 3

| | ELAN 311 | | | | | | | | |
|---|---|---|---|---|---|---|---|---|---|
| | LES | | | BUS | | | Route/ARP Server | | |
| Sub ELAN Name | Name | ATM address | IP address | Name | ATM address | IP address | Name | ATM | IP |
| Sub-ELAN 219 | LES-211 | ATM-211 | IP-211 | BUS-213 | ATM-213 | IP-213 | Route-ARP-311 | ATM-311 | IP-311 |
| Sub-ELAN 227 | LES-305 | ATM-305 | IP-305 | BUS-307 | ATM-307 | IP-307 | Route-ARP-311 | ATM-311 | IP-311 |

For adding new BUSs or route/ARP servers, conditional branch point 815 tests to determine if the network manager has entered information for a new BUS or route/ARP server. If the test result in step 815 is NO, control passes to step 811, and the process is exited. If the test result in step 815 is YES, control passes to step 817, in which configuration server 419 downloads the new BUS or route/ARP server information into broadcast/route server 415. Next, in step 819, broadcast/route server 415 registers itself with the new BUS, i.e., it makes the new BUS aware that broadcast/route server 415 has become a client of the new BUS. Also in step 819, broadcast/route server 415 informs a new route/ARP server that broadcast/route server 415 is available as a router.

Thereafter, conditional branch point 821 tests to determine if a new BUS is being added. If the test result in step 821 is YES, broadcast/route server 415 updates its ELAN configuration tables to associate the new BUS with an ELAN in step 823. Control then passes back to step 815, and the process continues as described above. If the test result in step 821 is NO, control passes to step 825, in which broadcast/route server 415 updates its routing tables, thus informing the route/ARP server that broadcast/route server 415 is available to it as a router. Control then passes back to step 815 and the process continues as described above.

Deleting LES, BUS, and route/ARP server from the network, as will be readily apparent to those skilled in the art, follows the same general processes as shown in FIG. 8.

Figure 9:
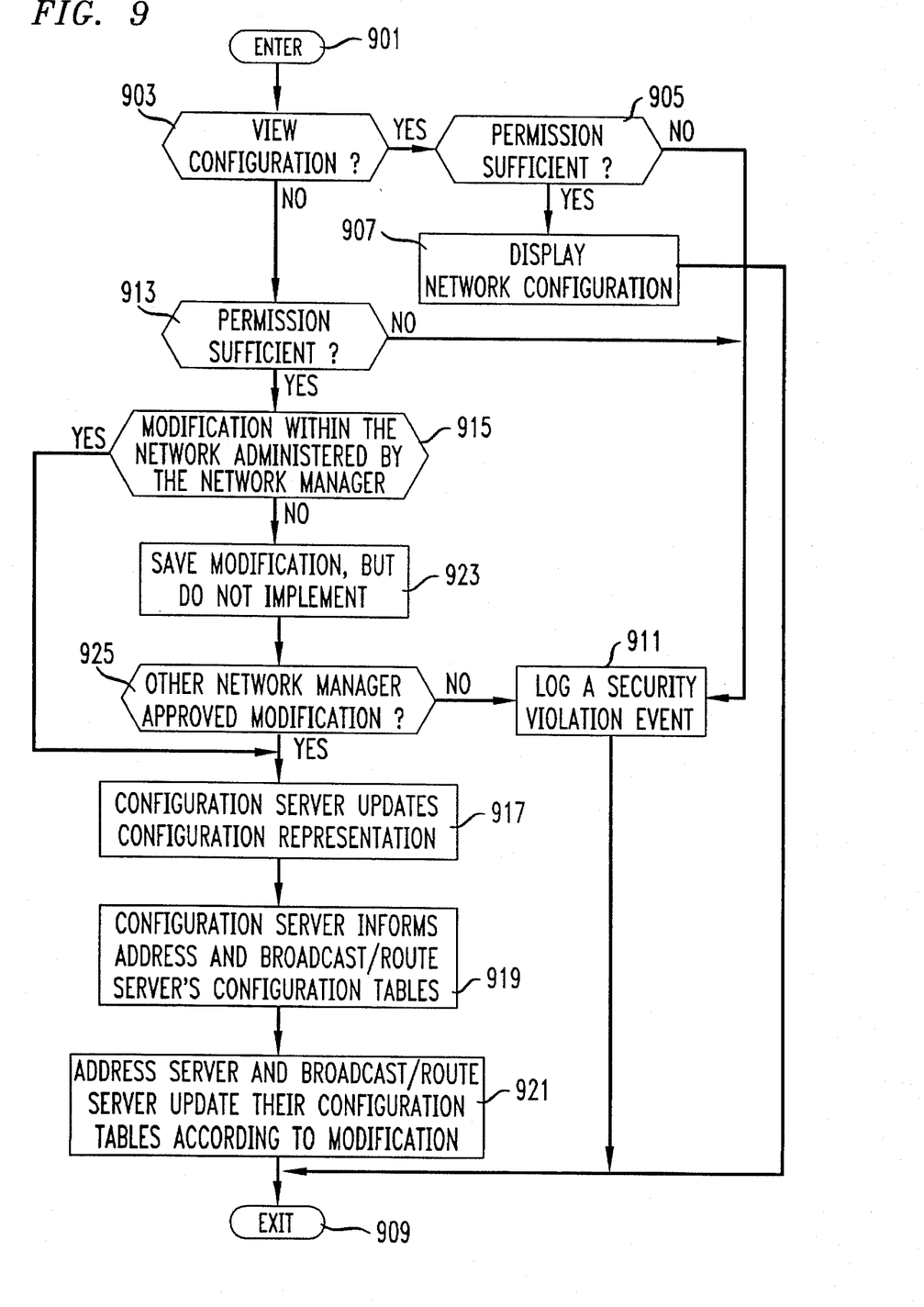
FIG. 9 shows an exemplary process for viewing or modifying an existing configuration in accordance with the principles of the invention.

FIG. 9 shows an exemplary process for viewing or modifying an existing configuration, in accordance with the principles of the invention. The process is entered in step 901 when the network manager logs into configuration server 419. Next, conditional branch point 903 tests to determine if the network manager wishes to view the network configuration. If the test result in step 903 is YES, control passes to conditional branch point 905, in which configuration server 419 tests to determine if the network manager has permission to view the requested network configuration. If the test result in step 905 is YES, control passes to step 907, and the requested network configuration is displayed. Control then passes to step 909, and the process is exited. If the test result in step 905 is NO, control passes to step 911, in which a security violation event is logged by configuration server 419. Control then passes to step 909 and the process is exited.

If the test result in step 903 is NO, control passes to conditional branch point 913, which tests to determine if the network manager has permission to modify the network configuration. If the test result in step 913 is NO, control passes to step 911, and a security violation event is recorded. The process then exits in step 909.

If the test result in step 913 is YES, control passes to conditional branch point 915, which tests to determine if a modification requested spans only those ELANs administered by the network manager. If the test result in step 915 is YES, control passes to step 917, in which configuration server 419 updates its configuration representation of the network. Next, in step 919, configuration server 419 informs address server 427 and broadcast/route server 415 of the requested modifications. Address server 427 and broadcast/route server 415 implement the requested modification in step 921, by updating the respective configuration tables. The process then exits in step 909.

If the test result in step 915 is NO, indicating a) that network managed by different entities are to be merged or b) a single network is to be split into distinct networks, control passes to step 923, in which configuration server 419 1) stores the proposed modification but 2) does not implement it by relaying the modification information to address server 427 and broadcast/route server 415 in accordance with an aspect of the invention. Control then passes to conditional branch point 925, which tests to determine if the other entity approves of the proposed modification, in accordance with an aspect of the invention. If the test result in step 925 is YES, control passes to step 917, and the process continues as described above. If the test result in step 925 is NO, control passes to step 911, and the process continues as described above.

Optional configuration server 419 also allows the network manager to a) browse the services offered by the multimedia server farm 421 and b) to choose one or more services to be made available to all clients of an ELAN. After the network manager chooses a multimedia service, the configuration server 4 19 communicates with multimedia server farm 421 to ensure that the multimedia server that provides the chosen service registers with the LES and BUS of the ELAN of the network manager. Similarly, when the network manager unsubscribes to a multimedia service by logging to the configuration server 419 and unselecting a previously selected multimedia service the configuration server 419 communicates with the multimedia server farm 421 to ensure that the multimedia server 421 un-registers as a client from the ELAN's LES and BUS. Also, as ELANs are reconfigured within the configuration server 419, the multimedia server 421 will reconfigure it's registration with appropriate LESs and BUSs. For example, when two ELANs are merged together, e.g., in response to a corporate merger, the multimedia services previously available to each separate ELAN will be available after the merger to all end points of the newly created merged ELAN.

Figure 10:
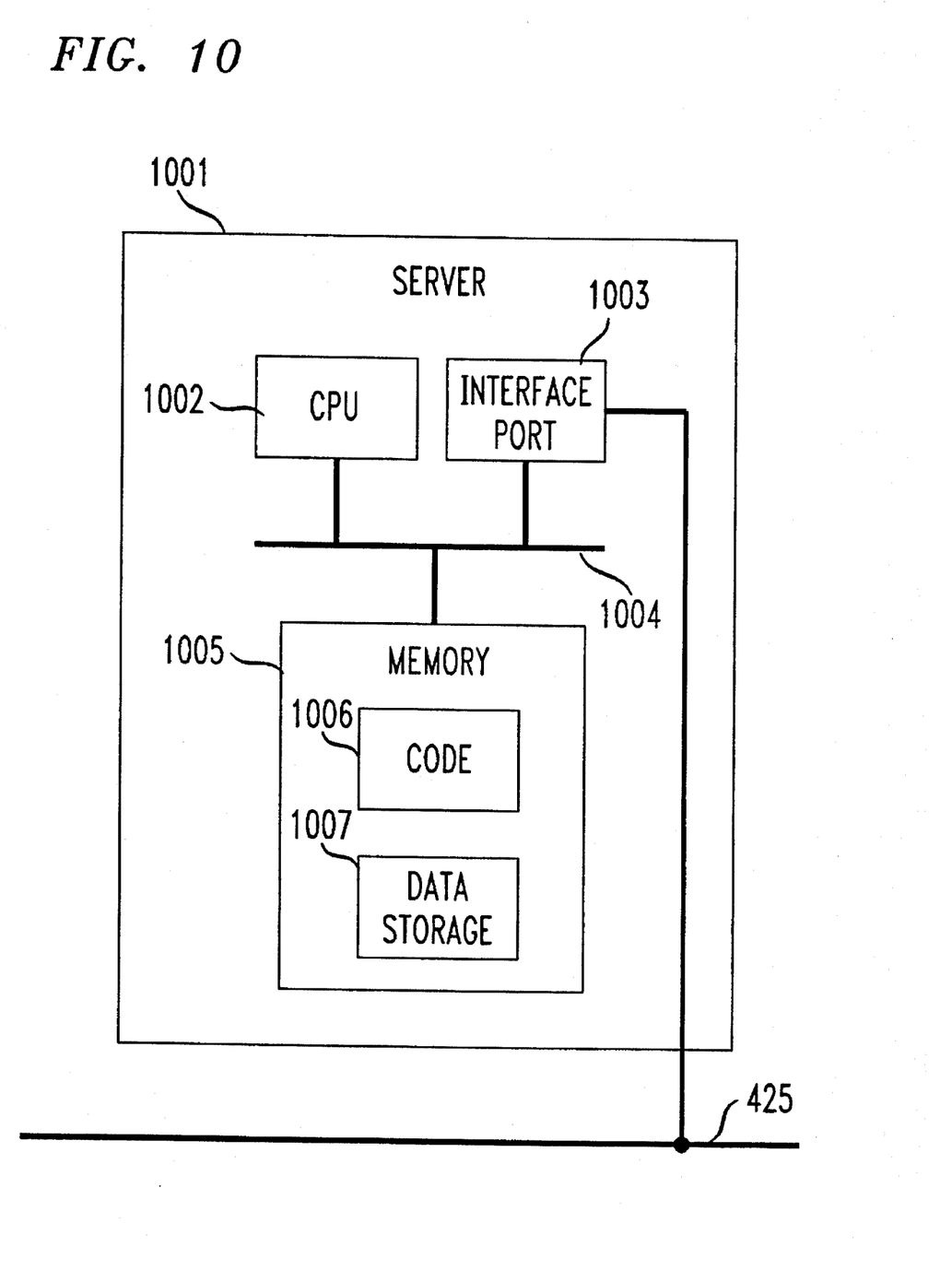
FIG. 10 is a block diagram view of an exemplary embodiment of generic server 1001, which may be used as the servers shown in FIG. 3.

FIG. 10 is a block diagram view of an exemplary embodiment of generic server 1001, which may serve as address server 427, broadcast/route server 415, configuration server or a server of multimedia server farm 421. Each server 1001 includes a) central processing unit (CPU) 1002, b) interface port 1003 c) data bus 1004 and d) memory 1005. Central processing unit (CPU) 1002 provides all the computational capability necessary to control the processes of server 1001. Data bus 1004 provides for the exchange of data between the components of server 1001. Interface port 1003 provides for the exchange of data between server 1001 and devices external to server 1001 via link high speed backbone 425. To this end, interface port 1003 contains, for example, well-known data transceivers. Memory 1005 includes 1) code portion 1006, which contains the instructions (program) used by CPU 1002 to control the processes of server 1001, such as those described herein above, and data storage portion 1007, which contains the information necessary to the server to perform its specific function, such as, an address table for an address server or ELAN configuration tables for configuration server 419.

The foregoing merely illustrates the principles of the invention. It will thus be appreciated that those skilled in the art will be able to devise various arrangements which, although not explicitly described or shown herein, embody the principles of the invention and are thus within its spirit and scope.

We claim:

1. Apparatus for directly interconnecting a plurality of sub-emulated local area networks (sub-ELANs) across a common asynchronous transfer mode (ATM) network to form a single ELAN, each of said sub-ELANs including a LAN Emulation Server (LES) and a Broadcast and Unknown Server (BUS), said apparatus comprising:

an ELAN contronect network directly connected to said common ATM network for interconnecting the LES and BUS of each of said sub-ELANs, the ELAN contronect network being configured to present itself to the LES and BUS of each of said sub-ELANs as a LAN Emulation Client (LEC).

2. The invention as defined in claim 1 wherein said ELAN contronect network comprises:

an address server;

a broadcast/route server; and a backbone network for interconnecting said address server and said broadcast/route server.

3. The invention as defined in claim 2 wherein said an address server converts a received client address into another address for that client.

4. The invention as defined in claim 3 wherein said address server requests an address conversion from the LES of at least one of said sub-ELANs when information necessary to perform is not available to said address server.

5. The invention as defined in claim 2 wherein said broadcast/route server transmits received information to at least one client connected to one of said sub-ELANs other than the sub-ELAN to which the client originating said received information is connected.

6. The invention as defined in claim 2 wherein said backbone network is a connectionless media.

7. The invention as defined in claim 2 wherein said ELAN contronect network further comprises:

a multimedia server for providing a multimedia service to each of said sub-ELANs authorized to use said multimedia service, said multimedia server being connected to said backbone.

8. The invention as defined in claim 2 further wherein said broadcast/route server includes:

means for receiving a layer-3 packet containing a broadcast indication at layer 2;

means for determining that said received packet is an address query at layer 3 and contains a layer-3 received client address;

means for requesting a corresponding address for said received client address from said address server;

means for receiving said corresponding address from said address server; and means for responding to said layer-3 packet with said corresponding address.

9. The invention as defined in claim 2 further wherein said broadcast/route server includes:

means for routing a received layer-3 packet to a final destination or a next-hop router.

10. The invention as defined in claim 2 wherein said broadcast/route server includes means for exchanging routing information with a router external to said ELAN contronect network for developing routes for packets.

11. The invention as defined in claim 2 further wherein said address server converts a received client address at layer 2 into another layer-2 address.

12. The invention as defined in claim 11 wherein said received client address at layer 2 is an medium access control (MAC) and said other layer-2 address is asynchronous transfer mode (ATM) address.

13. The invention as defined in claim 11 wherein said received client address at layer 2 is an asynchronous transfer mode (ATM) address and said other layer-2 address is a medium access control (MAC) address.

14. The invention as defined in claim 2 further wherein said address server converts received client addresses at layer 2 into a layer-3 address.

15. The invention as defined in claim 2 further wherein said address server converts received client addresses at layer 3 into a layer-2 address.

16. The invention as defined in claim 15 wherein said address conversion is performed in response to a request for such conversion from said broadcast/route server.

17. The invention as defined in claim 15 wherein said address conversion is performed in response to a request for such conversion from a LAN emulation server (LES) of one of said sub-ELANs.

18. The invention as defined in claim 15 wherein said received client address at layer 3 is an internet protocol (IP) and said layer-2 address is a medium access control (MAC) address.

19. The invention as defined in claim 15 wherein said received client address at layer 3 is an internet protocol (IP)

and said layer-2 address is an asynchronous transfer mode (ATM) address.

20. The invention as defined in claim 2 wherein said ELAN contronect network further comprises:

a configuration server connected to said backbone network for arranging the topology of the interconnection of said sub-ELANs.

21. The invention as defined in claim 20 wherein said configuration server includes:

means for storing the address of the servers of the plurality of said sub-ELANs that together comprises the ELAN.

22. The invention as defined in claim 20 wherein said configuration server includes:

means for communicating with said address server and said broadcast/route server to transmit thereto information indicating changes in the topology of the interconnection of said sub-ELANs.

23. The invention as defined in claim 20 wherein said configuration server includes:

means for obtaining approval at a required security level from each entity administering at least one of each of two or more ELANs comprised of sub-ELANs connected by said ELAN contronect network prior to merging said two or more ELANs.

24. The invention as defined in claim 20 wherein said configuration server includes:

means for obtaining approval at a required security level prior to splitting an ELAN into two or more ELANs administered by different entities.

25. The invention as defined in claim 20 wherein said ELAN contronect network includes a multimedia server for providing a multimedia service to each ELAN comprised of sub-ELANs connected by said ELAN contronect network authorized to use said multimedia service and wherein said configuration server includes:

means for communicating with said multimedia server to transmit thereto information indicating changes in the authorizations of said ELANs to use multimedia service.

26. A method for use in a contronect network which directly interconnects a plurality of sub-emulated local area networks (sub-ELANs) across a common asynchronous transfer mode (ATM) network to form a single ELAN, the method comprising the steps of:

receiving a layer-3 packet originated by a LAN Emulation Client (LEC) connected to one of said sub-ELANs, said received packet containing a broadcast indication at layer 2;

determining that said received packet is an address query at layer 3 and contains a layer-3 received client address;

obtaining a corresponding address for said received client address; and responding to said layer-3 packet with said corresponding address.

* * * * *